(12) United States Patent
Huff et al.

(10) Patent No.: US 10,047,989 B2
(45) Date of Patent: Aug. 14, 2018

(54) CAPACITY AND PRESSURE CONTROL IN A TRANSPORT REFRIGERATION SYSTEM

(75) Inventors: Hans-Joachim Huff, Mainz (DE); Lucy Yi Liu, Fayetteville, NY (US); Suresh Duraisamy, Liverpool, NY (US); Gilbert B. Hofsdal, Chittenango, NY (US); Michal Patriak, Camillus, NY (US)

(73) Assignee: CARRIER CORPORATION, Farmington, CT (US)

( * ) Notice: Subject to any disclaimer, the term of this patent is extended or adjusted under 35 U.S.C. 154(b) by 807 days.

(21) Appl. No.: 13/576,813

(22) PCT Filed: Mar. 7, 2011

(86) PCT No.: PCT/US2011/027372
§ 371 (c)(1),
(2), (4) Date: Aug. 2, 2012

(87) PCT Pub. No.: WO2011/112500
PCT Pub. Date: Sep. 15, 2011

(65) Prior Publication Data
US 2012/0318014 A1 Dec. 20, 2012

Related U.S. Application Data

(60) Provisional application No. 61/311,590, filed on Mar. 8, 2010.

(51) Int. Cl.
*F25B 49/02* (2006.01)
*F25B 1/10* (2006.01)
(Continued)

(52) U.S. Cl.
CPC ............... *F25B 49/02* (2013.01); *F25B 1/10* (2013.01); *F25B 9/008* (2013.01); *F25B 41/043* (2013.01);
(Continued)

(58) Field of Classification Search
CPC .... F25B 1/10; F25B 2400/13; F25B 2600/05; F25B 2341/0662
See application file for complete search history.

(56) References Cited

U.S. PATENT DOCUMENTS

| 1,253,895 A | * | 1/1918 | Shipley ........................... 62/218 |
| 2,500,688 A | * | 3/1950 | Kellie ............................. 62/175 |

(Continued)

FOREIGN PATENT DOCUMENTS

| CN | 101512244 A | 8/2009 |
| CN | 101512255 A | 8/2009 |

(Continued)

OTHER PUBLICATIONS

International Search Report and Written Opinion dated Mar. 5, 2012.

(Continued)

*Primary Examiner* — Ljiljana Ciric
*Assistant Examiner* — Alexis Cox
(74) *Attorney, Agent, or Firm* — Cantor Colburn LLP

(57) ABSTRACT

A transport refrigerant vapor compression system includes a controller for controlling operation of the transport refrigerant vapor compression system. The controller is configured to modulate a discharge pressure of the refrigerant compression device to control a cooling capacity of the transport refrigerant vapor compression system. The controller is configured to modulate the discharge pressure of a refrigerant compression device to control the cooling capacity of the transport refrigerant vapor compression system using both a refrigerant reservoir and an auxiliary expansion device without affecting superheat of the transport refrigerant vapor compression system.

11 Claims, 5 Drawing Sheets

(51) Int. Cl.
*F25B 9/00* (2006.01)
*F25B 41/04* (2006.01)

(52) U.S. Cl.
CPC . *F25B 2309/061* (2013.01); *F25B 2341/0662* (2013.01); *F25B 2400/13* (2013.01); *F25B 2400/23* (2013.01); *F25B 2600/0261* (2013.01); *F25B 2600/0271* (2013.01); *F25B 2600/111* (2013.01); *F25B 2600/112* (2013.01); *F25B 2600/2513* (2013.01); *F25B 2700/197* (2013.01); *F25B 2700/1931* (2013.01); *F25B 2700/1933* (2013.01); *F25B 2700/2106* (2013.01); *F25B 2700/21151* (2013.01); *F25B 2700/21152* (2013.01); *F25B 2700/21172* (2013.01); *F25B 2700/21173* (2013.01); *F25B 2700/21175* (2013.01); *Y02B 30/743* (2013.01)

(56) References Cited

U.S. PATENT DOCUMENTS

| | | | |
|---|---|---|---|
| 2,513,361 A * | 7/1950 | Rausch | 62/116 |
| 4,466,253 A | 8/1984 | Jaster | |
| 4,910,972 A * | 3/1990 | Jaster | 62/335 |
| 5,174,123 A | 12/1992 | Erickson | |
| 5,189,885 A | 3/1993 | Ni | |
| 5,692,389 A | 12/1997 | Lord et al. | |
| 5,816,055 A | 10/1998 | Ohman | |
| 6,385,980 B1 | 5/2002 | Sienel | |
| 6,883,341 B1 | 4/2005 | Lifson | |
| 6,973,797 B2 | 12/2005 | Nemit, Jr. | |
| 7,096,679 B2 | 8/2006 | Manole | |
| 7,272,948 B2 | 9/2007 | Taras et al. | |
| 7,299,649 B2 | 11/2007 | Healy et al. | |
| 7,353,659 B2 | 4/2008 | Crane et al. | |
| 7,891,201 B1 * | 2/2011 | Bush et al. | 62/115 |
| 2001/0025509 A1 * | 10/2001 | Fujii et al. | 62/467 |
| 2002/0069654 A1 * | 6/2002 | Doi et al. | 62/199 |
| 2002/0148246 A1 * | 10/2002 | Escobar et al. | 62/384 |
| 2003/0131618 A1 * | 7/2003 | Doi et al. | 62/180 |
| 2004/0250568 A1 * | 12/2004 | Sienel | 62/513 |
| 2005/0198997 A1 * | 9/2005 | Bush | 62/513 |
| 2006/0010899 A1 * | 1/2006 | Lifson et al. | 62/324.1 |
| 2006/0080989 A1 * | 4/2006 | Aoki et al. | 62/324.4 |
| 2006/0137386 A1 * | 6/2006 | Itsuki et al. | 62/510 |
| 2006/0277931 A1 * | 12/2006 | Nakamura et al. | 62/196.1 |
| 2007/0039336 A1 * | 2/2007 | Wu et al. | 62/160 |
| 2007/0151269 A1 | 7/2007 | Crane et al. | |
| 2008/0022706 A1 * | 1/2008 | Sakimichi et al. | 62/190 |
| 2008/0092573 A1 | 4/2008 | Vaisman et al. | |
| 2008/0223055 A1 * | 9/2008 | Choi et al. | 62/193 |
| 2008/0289354 A1 * | 11/2008 | Dudley et al. | 62/335 |
| 2009/0260380 A1 * | 10/2009 | Okamoto | 62/204 |
| 2009/0293515 A1 | 12/2009 | Lifson et al. | |
| 2010/0077777 A1 * | 4/2010 | Lifson et al. | 62/117 |
| 2010/0115975 A1 * | 5/2010 | Mitra et al. | 62/196.1 |
| 2010/0132399 A1 * | 6/2010 | Mitra et al. | 62/498 |
| 2010/0263393 A1 * | 10/2010 | Chen et al. | 62/115 |
| 2010/0318006 A1 * | 12/2010 | Horst | 601/34 |
| 2011/0138825 A1 * | 6/2011 | Chen et al. | 62/115 |
| 2011/0162397 A1 * | 7/2011 | Huff et al. | 62/115 |
| 2012/0011866 A1 * | 1/2012 | Scarcella et al. | 62/79 |
| 2012/0167601 A1 * | 7/2012 | Cogswell et al. | 62/115 |
| 2012/0192579 A1 * | 8/2012 | Huff et al. | 62/115 |
| 2012/0198868 A1 * | 8/2012 | Huff et al. | 62/115 |
| 2012/0227427 A1 * | 9/2012 | Liu et al. | 62/115 |
| 2012/0285185 A1 * | 11/2012 | Huff | 62/115 |
| 2012/0318008 A1 * | 12/2012 | Liu et al. | 62/115 |
| 2013/0031934 A1 * | 2/2013 | Huff et al. | 62/510 |

FOREIGN PATENT DOCUMENTS

| | | |
|---|---|---|
| EP | 1146299 A1 | 10/2001 |
| EP | 1207359 | 5/2002 |
| EP | 2068094 A1 | 6/2009 |
| JP | 2003106694 A | 4/2003 |
| WO | 2008039204 | 4/2008 |
| WO | 2010036614 | 4/2010 |

OTHER PUBLICATIONS

Second Chinese Office Action for application 201180012944.5, dated Mar. 25, 2015, 10 pages.
International Preliminary Report on Patentability dated Sep. 20, 2012.
Chinese First Office Action for application CN 201180012944.5, dated Jul. 24, 2014, 5 pages.

* cited by examiner

CAPACITY AND PRESSURE CONTROL IN A TRANSPORT REFRIGERATION SYSTEM

CROSS-REFERENCE TO RELATED APPLICATION

This application claims priority to U.S. Provisional Patent Application Ser. No. 61/311,590 entitled "Capacity and Pressure Control in a Transport Refrigeration System" filed on Mar. 8, 2010, the content of which is incorporated herein by reference in its entirety.

FIELD OF THE INVENTION

This disclosure relates generally to refrigeration systems and, more specifically, to methods and apparatus for controlling a refrigerant vapor compression system.

BACKGROUND OF THE INVENTION

Conventional vapor compression systems typically include a compressor, a heat rejection heat exchanger, a heat absorption heat exchanger, and an expansion device disposed upstream of the heat absorption heat exchanger. Some systems further include a second expansion device downstream of the heat rejection heat exchanger, such as a suction modulation valve. These basic system components are interconnected by working fluid lines in a closed circuit.

Depending upon the characteristics of the working fluid in use in a particular application, a vapor compression system may be operated in either a subcritical mode or a transcritical mode. In vapor compression systems operating in a subcritical cycle, both the vapor heat rejection heat exchanger and the heat absorption heat exchanger operate at pressures below the critical pressure of the working fluid. Thus, in the subcritical mode, the vapor heat rejection heat exchanger functions as a working fluid condenser and the heat absorption heat exchanger functions as a working fluid evaporator.

However, in refrigerant vapor compression systems operating in a transcritical cycle, the vapor heat rejection heat exchanger operates at a refrigerant temperature and pressure in excess of the refrigerant's critical pressure, while the heat absorption heat exchanger operates at a refrigerant temperature and pressure in the subcritical range. Thus, in the transcritical mode, the vapor heat rejection heat exchanger functions as a working fluid gas cooler and the heat absorption heat exchanger functions an as a working fluid evaporator.

In vapor compression systems used in refrigeration applications, commonly referred to as refrigerant vapor compression systems, the working fluid is refrigerant. Refrigerant vapor compression systems charged with conventional refrigerants, such as for example, fluorocarbon refrigerants such as, but not limited to, hydro chlorofluorocarbons (HCFCs), such as R22, and more commonly hydro fluorocarbons (HFCs), such as R134a, R404A, and R407C, typically operate in the subcritical mode. "Natural" refrigerants, such as carbon dioxide, are also used in refrigerant vapor compression systems instead of HCFC or HFC refrigerants. Because carbon dioxide has a low critical temperature, most refrigerant vapor compression systems charged with carbon dioxide as the refrigerant are designed for operation in the transcritical mode.

Refrigerant vapor compression systems are commonly used for conditioning air to be supplied to a climate controlled comfort zone within a residence, office building, hospital, school, restaurant or other facility. Refrigerant vapor compression system are also commonly used for refrigerating air supplied to display cases, merchandisers, freezer cabinets, cold rooms or other perishable/frozen product storage areas in commercial establishments. Refrigerant vapor compression systems are also commonly used in transport refrigeration systems for refrigerating air supplied to a temperature controlled cargo space of a truck, trailer, container or the like for transporting perishable/frozen items by truck, rail, ship or intermodal.

Refrigerant vapor compression systems used in connection with transport refrigeration systems are generally subject to more stringent operating conditions than in air conditioning or commercial refrigeration applications due to the wide range of operating load conditions and the wide range of outdoor ambient conditions over which the refrigerant vapor compression system must operate to maintain product within the cargo space at a desired temperature. The desired temperature at which the cargo needs to be controlled can also vary over a wide range depending on the nature of cargo to be preserved. The refrigerant vapor compression system must not only have sufficient capacity to rapidly pull down the temperature of product loaded into the cargo space at ambient temperature, but also operate efficiently at low load when maintaining a stable product temperature during transport. Additionally, transport refrigerant vapor compression systems are subject to cycling between an operating mode and standstill mode, i.e. an idle state.

In more complex refrigeration vapor compression systems, such as those equipped with a multi-stage compression device and capacity modulation, it is customary to provide a number of refrigerant flow control devices to permit selective control of refrigerant flow through the various branches of the refrigerant circuit. The refrigerant flow through the flow control devices can be used to control compressor discharge pressure to modulate cooling capacity of transport refrigeration vapor compression systems (e.g., to match a cooling load).

SUMMARY OF THE INVENTION

The present disclosure provides a refrigerant vapor compression system that can include a compressor having a suction port and a discharge port, a refrigerant heat rejection heat exchanger operatively coupled downstream to the discharge port of the compressor, a refrigerant heat absorption heat exchanger operatively coupled downstream to the refrigerant heat rejection heat exchanger, a compressor suction inlet line connecting the refrigerant heat absorption heat exchanger to the suction port of the compressor, and an expansion device operatively coupled upstream of the refrigerant heat absorption heat exchanger and downstream of the refrigerant heat rejection heat exchanger. The refrigerant vapor compression system further includes a controller in communication with components of the transport refrigeration unit. The controller is configured to operate the refrigerant vapor compression system to control at least one expansion device to control compressor discharge pressure to modulate the transport refrigeration unit cooling capacity or compressor discharge temperature.

In one aspect of the disclosure, components of the transport refrigeration system can be less robust or reduced in size or removed.

In one aspect of the disclosure, the system further includes a second expansion valve upstream of the refrigerant heat absorption heat exchanger and a refrigerant reservoir.

In one aspect of the disclosure, operating the refrigerant vapor compression system in a first mode modulates the transport refrigeration unit cooling capacity using the SMV, in a second mode modulates the transport refrigeration unit cooling capacity using a second expansion valve upstream of the refrigerant heat absorption heat exchanger and a refrigerant reservoir, and in a third mode modulates the transport refrigeration unit cooling capacity using the SMV and the second expansion valve combined with the refrigerant reservoir.

In one aspect of the disclosure, the system can use a second expansion valve upstream of the refrigerant heat absorption heat exchanger and a refrigerant reservoir to independently control compressor discharge temperature from the transport refrigeration unit cooling capacity.

In another aspect of the disclosure, the system can use a second expansion valve upstream of the refrigerant heat absorption heat exchanger and a refrigerant reservoir to independently control compressor discharge temperature from the transport refrigeration unit cooling capacity, transport refrigeration unit component super heat such as, but not limited to compressor superheat, refrigerant heat absorption heat exchanger superheat, or SMV superheat.

In one embodiment, a transport refrigerant vapor compression system can include a primary refrigerant circuit including a refrigerant compression device having at least one compression stage, a refrigerant heat rejection heat exchanger operatively coupled downstream of a discharge port of the device, a refrigerant heat absorption heat exchanger downstream of said refrigerant heat rejection heat exchanger operatively coupled upstream of an inlet port of the compression device, a primary expansion device disposed in the refrigerant circuit downstream of said refrigerant heat rejection heat exchanger and upstream of said refrigerant heat absorption heat exchanger; an auxiliary expansion device disposed in the refrigerant flow path, the auxiliary expansion device inserted in said refrigerant circuit downstream of the refrigerant heat rejection heat exchanger and upstream of the refrigerant heat absorption heat exchanger; and a controller for controlling operation of the refrigeration vapor compression system, the controller operative to modulate a discharge pressure of the refrigerant compression device to control a cooling capacity of the transport refrigerant vapor compression system.

In another embodiment, a refrigerant vapor compression system can include a primary refrigerant circuit including a refrigerant compression device having a first compression stage and a second compression stage, a refrigerant heat rejection heat exchanger operatively coupled downstream of a discharge port of the device, a refrigerant heat absorption heat exchanger downstream of said refrigerant heat rejection heat exchanger operatively coupled upstream of an inlet port of the compression device, a primary expansion device disposed in the refrigerant circuit downstream of said refrigerant heat rejection heat exchanger and upstream of said refrigerant heat absorption heat exchanger; an auxiliary expansion device disposed in the refrigerant flow path, the auxiliary expansion device inserted in said refrigerant circuit downstream of the refrigerant heat rejection heat exchanger and upstream of the refrigerant heat absorption heat exchanger; and a controller for controlling operation of the refrigeration vapor compression system, the controller operative to reduce a refrigerant compression device discharge temperature using the auxiliary expansion device disposed in the refrigerant flow path and active refrigerant charge levels in the refrigerant circuit.

In yet another embodiment, in a refrigerant vapor compression system can include a compressor, a refrigerant heat rejection heat exchanger operatively coupled to the compressor, a refrigerant heat absorption heat exchanger downstream of said refrigerant heat rejection heat exchanger operatively coupled upstream of an inlet port of the compressor, a primary expansion device operatively coupled downstream of said refrigerant heat rejection heat exchanger and upstream of said refrigerant heat absorption heat exchanger, a method for operating the refrigerant vapor compression system comprising determining a cooling load of the refrigerant vapor compression system; modulating a cooling capacity to match the determined cooling load; modulating a discharge pressure of the compressor to control the cooling capacity of the refrigerant vapor compression system or a discharge temperature of the compressor.

BRIEF DESCRIPTION OF THE DRAWINGS

For a further understanding of the invention, reference will be made to the following detailed description of the invention which is to be read in connection with the accompanying drawing, wherein.

DETAILED DESCRIPTION OF THE INVENTION

Figure 1:
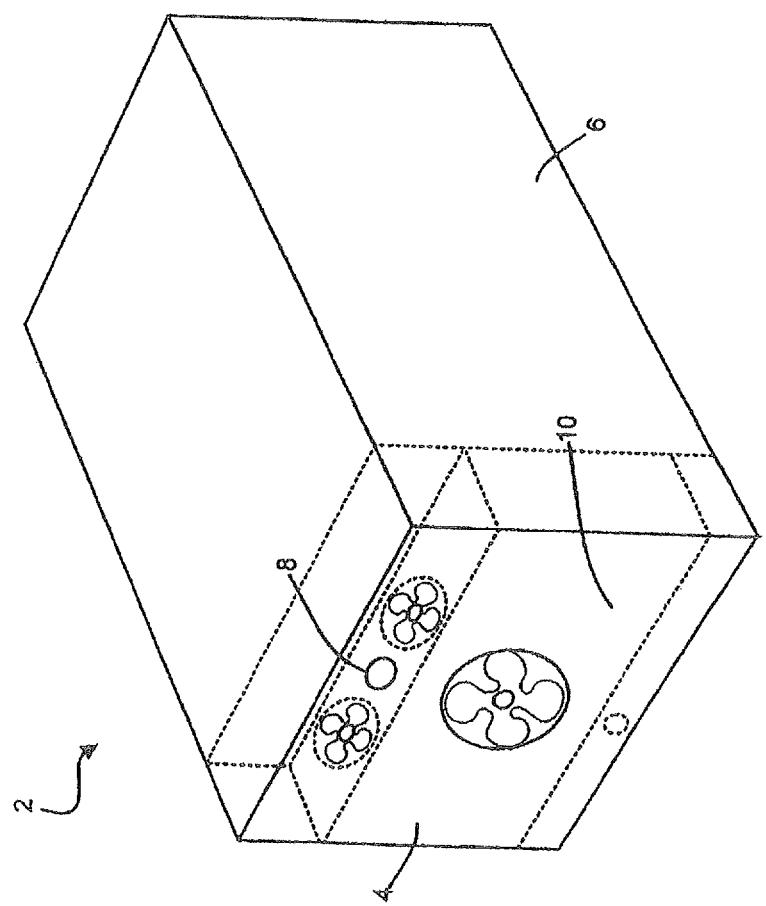
FIG. 1 schematically illustrates an embodiment of a refrigerant vapor compression system according to the application.

Referring to FIG. 1, a refrigerant vapor compression system 2 may include a transport refrigeration unit 4 coupled to an enclosed space within a container 6. The container 6 may be a temperature controlled environment, such as a cargo box of a refrigerated transport truck, trailer or container, or a display case, merchandiser, freezer cabinet, cold room or other perishable/frozen product storage area in a commercial establishment, or a climate controlled comfort zone within a residence, office building, hospital, school, restaurant or other facility. In the disclosed example, the refrigerant vapor compression system 2 is of the type utilized on refrigerated transport truck. As shown in FIG. 1, the transport refrigeration unit 4 is configured to maintain a programmed thermal environment within the container 6.

In FIG. 1, the transport refrigeration unit 4 is mounted at one end of the container 6. However, the transport refrigeration unit 4 may also be mounted to one or more sides of the container 6. In one embodiment, a plurality of transport refrigeration units 4 may be mounted to a single container 6. Alternatively, a single transport refrigeration unit 4 may be mounted to a plurality of containers 6 or multiple enclosed spaces within a single container. The transport refrigeration unit 4 typically operates to intake air at a first temperature and to exhaust air at a second temperature. In one embodiment, the exhaust air from the transport refrigeration unit 4 will be warmer than the intake air such that the transport refrigeration unit 4 is utilized to warm the air in the container 6. In another embodiment, the exhaust air from the transport refrigeration unit 4 will be cooler than the intake air such that the transport refrigeration unit 4 is utilized to cool the air in the container 6.

In one embodiment, the transport refrigeration unit 4 may include one or more temperature sensors to continuously or repeatedly monitor the return air temperature and/or the supply air temperature. As shown in FIG. 1, a supply air temperature sensor (STS) 8 of the transport refrigeration unit 4 may provide the supply temperature and a return air temperature sensor (RTS) 10 of the transport refrigeration unit 4 may provide the return temperature to the transport refrigeration unit 4, respectively. Alternatively, the supply temperature and the return temperature may be determined using remote sensors.

A refrigerant vapor compression system 2 may provide air with controlled temperature, humidity or/and species concentration into an enclosed chamber where cargo is stored such as in container 6. The refrigerant vapor compression system 2 is capable of controlling a plurality of the environmental parameters or all the environmental parameters within corresponding ranges with a great deal of variety of cargoes and under many types of ambient conditions.

Figure 2:
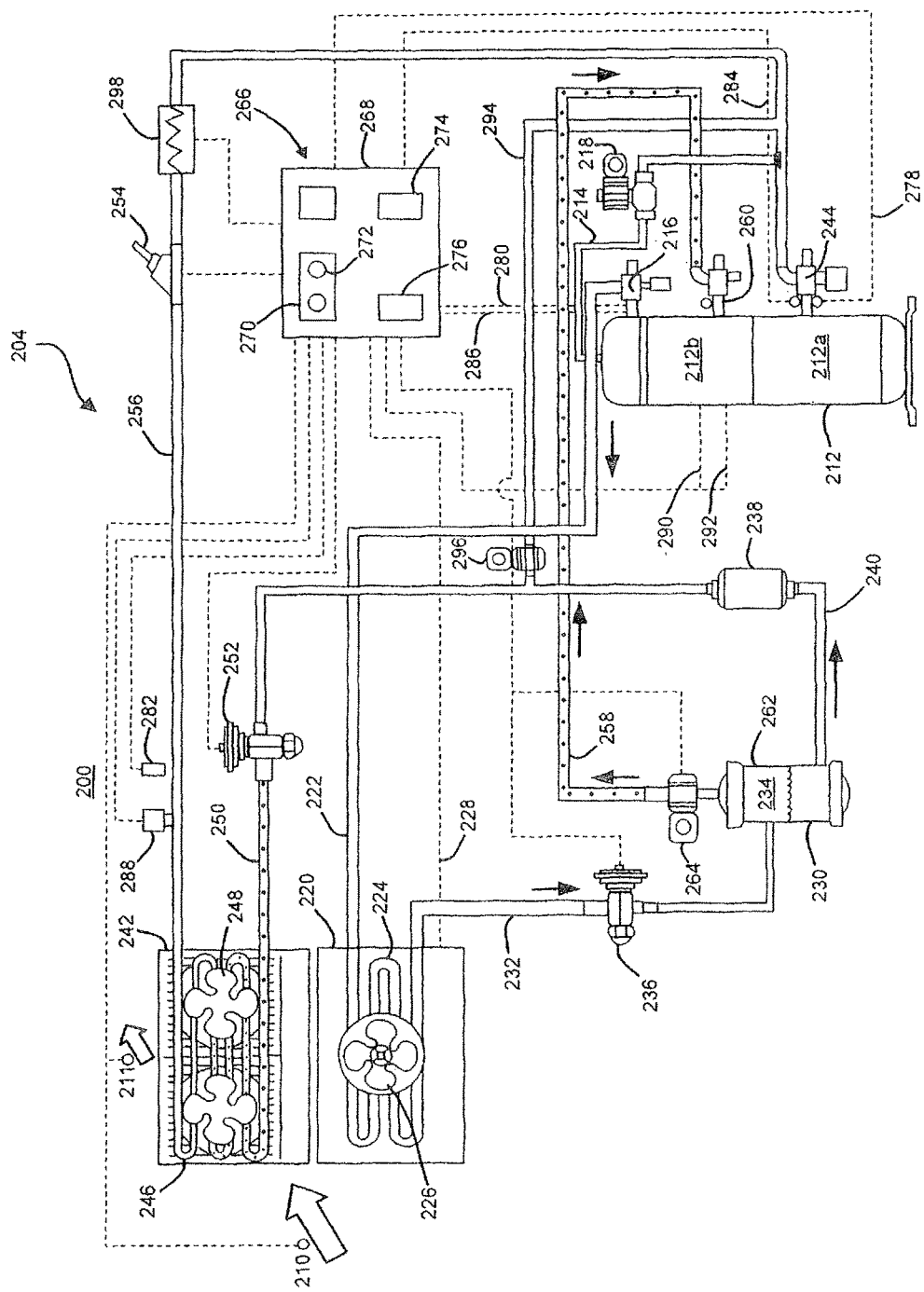
FIG. 2 schematically illustrates an exemplary embodiment of the transport refrigeration unit of FIG. 1.

Referring to FIG. 2 of the drawings, an exemplary embodiment of a refrigerant vapor compression system 200 designed for operation in a transcritical cycle with a low critical point refrigerant is shown. The low critical point refrigerant may be carbon dioxide and refrigerant mixtures containing carbon dioxide, for example. However, it is to be understood that the refrigerant vapor compression system 200 may also be operated in a subcritical cycle with a higher critical point refrigerant such as conventional hydro chlorofluorocarbon and hydro fluorocarbon refrigerants.

The refrigerant vapor compression system 200 is particularly suitable for use in a transport refrigeration system for refrigerating the air or other gaseous atmosphere within the temperature controlled enclosed volume such as a cargo space of a truck, trailer, container, or the like for transporting perishable/frozen goods. The refrigerant vapor compression system 200 is also suitable for use in conditioning air to be supplied to a climate controlled comfort zone within a residence, office building, hospital, school, restaurant, or other facility. The refrigerant vapor compression system 200 could also be employed in refrigerating air supplied to display cases, merchandisers, freezer cabinets, cold rooms or other perishable/frozen product storage areas in commercial establishments.

The refrigerant vapor compression system 200 can include a multi-stage compressor 212, wherein the refrigerant is compressed to a higher temperature and pressure. The compressor 212 may be powered by single phase electric power, three phase electrical power, and/or a diesel engine and can, for example, operate at a constant speed or operate with a variable frequency drive. The compressor 212 may be a scroll compressor, a rotary compressor, a reciprocal compressor, or the like. The transport refrigeration unit 204 requires electrical power from, and can be connected to, a power supply unit (not shown) such as a standard commercial power service, an external power generation system such as that found shipboard, a diesel generator, or the like.

In the illustrated embodiment, the compressor 212 is a single multiple stage refrigerant compressor, for example a compressor disposed in the primary refrigerant circuit and having a first compression stage 212a and a second compression stage 212b. The first and second compression stages are disposed in series refrigerant flow relationship, with the refrigerant leaving the first compression stage 212a passing directly to the second compression stage 212b for further compression. Alternatively, the compressor 212 may comprise a pair of independent compressors 212a and 212b, connected in series refrigerant flow relationship in the primary refrigerant circuit via a refrigerant line connecting the discharge outlet port of the first compressor 212a in refrigerant flow communication with an inlet port (e.g., the suction inlet port) of the second compressor 212b. In the independent compressor embodiment, the compressors 212a and 212b may be reciprocating compressors, rotary compressors, or any other type of compressor or a combination of any such compressors. In the embodiment depicted in FIG. 2, the refrigerant vapor compression system 200 includes a bypass line 214 providing a refrigerant flow passage from a discharge port 216 or intermediate port 260 of the compressor 212 back to the suction side of the compressor. An unload valve 218 disposed in the bypass line 214 may be selectively positioned in an open position in which refrigerant flow passes through the bypass line 214 and a closed position in which refrigerant flow through the bypass line 214 is partially restricted or shut off.

The refrigerant vapor compression system 200 further includes a refrigerant heat rejection heat exchanger 220 operatively coupled to the discharge port 216 of the compressor 212 along a compressor discharge line 222. In a refrigerant vapor compression system operating in a transcritical cycle, such as systems utilizing carbon dioxide refrigerants, for example, the refrigerant heat rejection heat exchanger 220 is commonly referred to as a gas cooler. The supercritical refrigerant (gas) passes in heat exchange relationship with a cooling medium such as ambient gas or liquid (e.g., air or water), for example. In a refrigerant vapor compression system operating in a subcritical cycle, such as systems utilizing fluorocarbon refrigerants for example, the refrigerant heat rejection heat exchanger 220 is commonly referred to as a condenser. The condenser may include a refrigerant condensing heat exchanger through which hot, high pressure refrigerant vapor passes in heat exchange relationship with the cooling medium and is condensed to a liquid.

The refrigerant heat rejection heat exchanger 220 may comprise a finned-tube heat exchanger, such as a fin and round tube heat exchange coil or a fin and mini-channel flat tube heat exchanger, for example. Refrigerant passes through serpentine tubes 224 in heat exchange relationship with ambient air being drawn through the heat exchanger 220 by one or more fans 226. The air stream from the fan 226 allows heat to be removed from the refrigerant circulating within the refrigerant heat rejection heat exchanger 220. An ambient air temperature sensor (AAT) 228 may be positioned upstream of the fan 226 to sense the ambient air temperature.

The refrigerant vapor compression system 200 may include a receiver 230 operatively disposed downstream of the refrigerant heat rejection heat exchanger 220 along a condenser discharge line 232 to provide storage for excess liquid refrigerant (e.g., low temperature operation). In one example, the receiver 230 is a flash tank receiver having a separation chamber 234 where refrigerant in the liquid state collects in a lower portion of the separation chamber and refrigerant in the vapor state collects in the portion of the separation chamber above the liquid refrigerant. In the example, the refrigerant is carbon dioxide ($CO_2$). As the $CO_2$ refrigerant leaves the refrigerant heat rejection heat exchanger 220, it passes through an auxiliary expansion valve 236. The auxiliary expansion valve 236 may be a variable control valve selectively positionable so as to expand the refrigerant to a lower pressure so it enters the flash tank receiver 230 as a mixture of liquid refrigerant and vapor. The flash tank receiver 230 operates as a charge control tank. The liquid refrigerant settles in the lower portion of the flash tank receiver 230 and the refrigerant vapor collects in the upper portion. A filter drier 238 may be disposed downstream of the receiver 230 along a refrigerant liquid line 240 to keep the refrigerant clean and dry.

In another embodiment, the receiver 230 may include a water-cooled condenser and associated plumbing (not shown).

Whether the refrigerant vapor compression system 200 is operating in a transcritical cycle or a subcritical cycle, the system further includes a refrigerant heat absorption heat exchanger 242, also referred to herein as an evaporator, operatively coupled between the refrigerant heat rejection heat exchanger 220 and a suction port 244 of the compressor 212. In the heat absorption heat exchanger 242, refrigerant liquid or a mixture of refrigerant liquid and vapor is passed in heat exchange relationship with a fluid to be cooled, most commonly air, drawn from and returned to the container 6. In one example, the refrigerant heat absorption heat exchanger 242 comprises a finned tube heat exchanger 246 through which refrigerant passes in heat exchange relationship with air drawn from and returned to the refrigerated container 6 by one or more evaporator fans 248. The finned tube heat exchanger 246 may comprise, for example, a fin and round tube heat exchange coil or a fin and mini-channel flat tube heat exchanger. The evaporator fan 248 may be located and ducted so as to circulate the air contained within the container 6. In one embodiment, the evaporator fan 248 directs the stream of air across the surface of the finned tube heat exchanger 246, thereby removing heat from the air, and the reduced temperature air is then circulated within the enclosed volume of the container 6 to lower the temperature of the enclosed volume.

A primary expansion device 252 may be connected along an evaporator inlet line 250 between an output of the refrigerant heat rejection heat exchanger 220 and an input the refrigerant heat absorption heat exchanger 242. In the disclosed embodiment, the primary expansion device is an electronic expansion valve 252 to meter the refrigerant flow so as to maintain a desired level of superheat in the refrigerant vapor leaving the evaporator or heat absorption heat exchanger 242. The expansion valve 252 can be an adiabatic expansion valve and help to ensure that no liquid is present in the refrigerant leaving the heat absorption heat exchanger 242. The low pressure refrigerant vapor leaving the evaporator 242 returns to the suction port 244 of the first compression stage or first compressor 212a.

In one embodiment, the refrigerant vapor compression system 2 further includes a suction modulation valve 254. In the illustrated example, the suction modulation valve 254 is positioned along a suction inlet line 256 between the outlet of the refrigerant heat absorption heat exchanger 242 and the tee for the compressor unload bypass line 214. The suction modulation valve 254 can be an adiabatic expansion device and be used for capacity modulation. The suction modulation valve 254 may comprise a pulse width modulated solenoid valve in one example.

Additionally, the refrigerant vapor compression system 2 may include an economizer circuit establishing refrigerant vapor flow along an injection line 258 between the receiver 230 and an intermediate inlet port 260 of the compressor 212. The economizer circuit includes an economizer device 262 and an economizer solenoid valve 264 to control the refrigerant flow between the economizer device 262 and a compressor economize port. In the illustrated embodiment, the economizer device 262 is the flash tank receiver 230, and the economizer solenoid valve 264 is disposed in operative association with and downstream of the economizer device 262. The economizer solenoid valve 264 may be a high pressure electronic expansion valve, for example. The vapor injection line 258 connects the upper portion of the separation chamber 234 of the flash tank receiver 230 to the intermediate inlet port 260 of the compressor 212.

The refrigerant vapor compression system 2 also includes a control system operatively associated therewith for controlling operation of the refrigerant vapor compression system. The control system can include a controller 266 that can determine the desired mode of operation in which to operate the refrigerant vapor compression system 2 based upon consideration of refrigeration load requirements, ambient conditions and various sensed system operating parameters. In the disclosed embodiment, the controller 266 includes a microprocessor board 268 that contains a microprocessor 270 and its associated memory 272, an input/output (I/O) board 274, which includes an analog to digital converter 276 which receives temperature inputs and pressure inputs from various points in the system, AC current inputs, DC current inputs, voltage inputs and humidity level inputs. The memory 272 of the controller 266 can contain operator or owner preselected, desired values for various operating parameters within the system 2 including, but not limited to, temperature set points for various locations within the system 2 or the container 6, pressure limits, current limits, engine speed limits, and any variety of other desired operating parameters or limits with the system 2. In addition, input/output board 274 includes drive circuits or relays which receive signals or current from the controller 266 and in turn control various external or peripheral devices in the system 2, such as the expansion valve 252, for example.

Among the specific sensors and transducers monitored by the controller 266 are the return air temperature sensor (RAT) 210 and supply air temperature sensor (SAT) 211 inputs into the microprocessor 270 a value according to the evaporator return air temperature; and the supply air temperature, respectively; the ambient air temperature (AAT) sensor 228 can input into the microprocessor 270 value according to the ambient air temperature read in front of the refrigerant heat rejection heat exchanger 220; a compressor suction temperature (CST) sensor 278; that can input to the microprocessor 270 a variable resistor value according to the compressor suction temperature; a compressor discharge temperature (CDT) sensor 280, that can input to the microprocessor 270 a value according to the compressor discharge temperature inside the dome of the compressor 212; an evaporator outlet temperature (EVOT) sensor 282, that can input to the microprocessor 270 a value according to the outlet temperature of the refrigerant heat absorption heat exchanger 242; the compressor suction pressure (CSP) transducer 284, that can input to the microprocessor 270 a value or voltage according to the compressor suction value of the compressor 212; the compressor discharge pressure (CDP) transducer 286, that can input to the microprocessor 270 a voltage according to the compressor discharge value of the compressor 212; the evaporator outlet pressure (EVOP) transducer 288 that can input to the microprocessor 270 a voltage according to the outlet pressure of the refrigerant heat absorption heat exchanger 242; a direct current sensor 290 and alternating current sensor 292 (CT1 and CT2, respectively), which input to the microprocessor 270 a variable voltage values corresponding to the current drawn by the system 2.

The controller 266 processes the data received from the various sensors and controls operation of the compressor 212, operation of the fan(s) 226 associated with the refrigerant heat rejection heat exchanger 220, operation of the evaporator fan(s) 248, operation of the expansion valve 252, and operation of the suction modulation valve (SMV) 254. In the FIG. 2 embodiment, the controller 266 may also control the positioning of the unload valve 218 to selectively open the unload valve to bypass refrigerant from an intermediate pressure stage of the compressor 212 through the bypass line 214 back to the suction side of the compressor 212 when it is desired to unload the first stage of the compressor.

In the embodiment depicted in FIG. 2, the refrigerant vapor compression system 2 may further include a refrigerant liquid injection line 294. The refrigerant liquid injection line 294 can tap into the refrigerant liquid line 240 at a location downstream of the receiver 230 and upstream of the expansion valve 252 and open into the suction port 244 of the compressor 212. A liquid injection flow control device 296 may be disposed in the liquid injection line 294. The liquid injection flow control device 296 may comprise a flow control valve selectively positionable between an open position, wherein refrigerant liquid flow may pass through the liquid injection line 294, and a closed position wherein refrigerant liquid flow through the refrigerant liquid injection line 294 is reduced or blocked. In an embodiment, the liquid injection flow control device 296 comprises a two-position solenoid valve of the type selectively positionable between a first open position and a second closed position.

The controller 266 may also control the positioning of the auxiliary expansion valve 236, the economizer solenoid valve 264, and/or the liquid injection flow control device 296. The controller 266 may position the auxiliary expansion valve 236 responsive to temperature and pressure measurements at the exit of the refrigerant heat rejection heat exchanger 220. The controller 266 may also control the positioning of the economizer solenoid valve 264 to selectively permit refrigerant vapor to pass from the economizer device 262 through the injection line 258 for admittance into the intermediate inlet port 260 of the compressor 212. Similarly, the controller 266 may also position the liquid injection flow control device 296 in an open position for selectively permitting refrigerant liquid to pass from the receiver 230 through the liquid injection line 294 for injection into the suction port 244 of the compressor 212.

Figure 3:
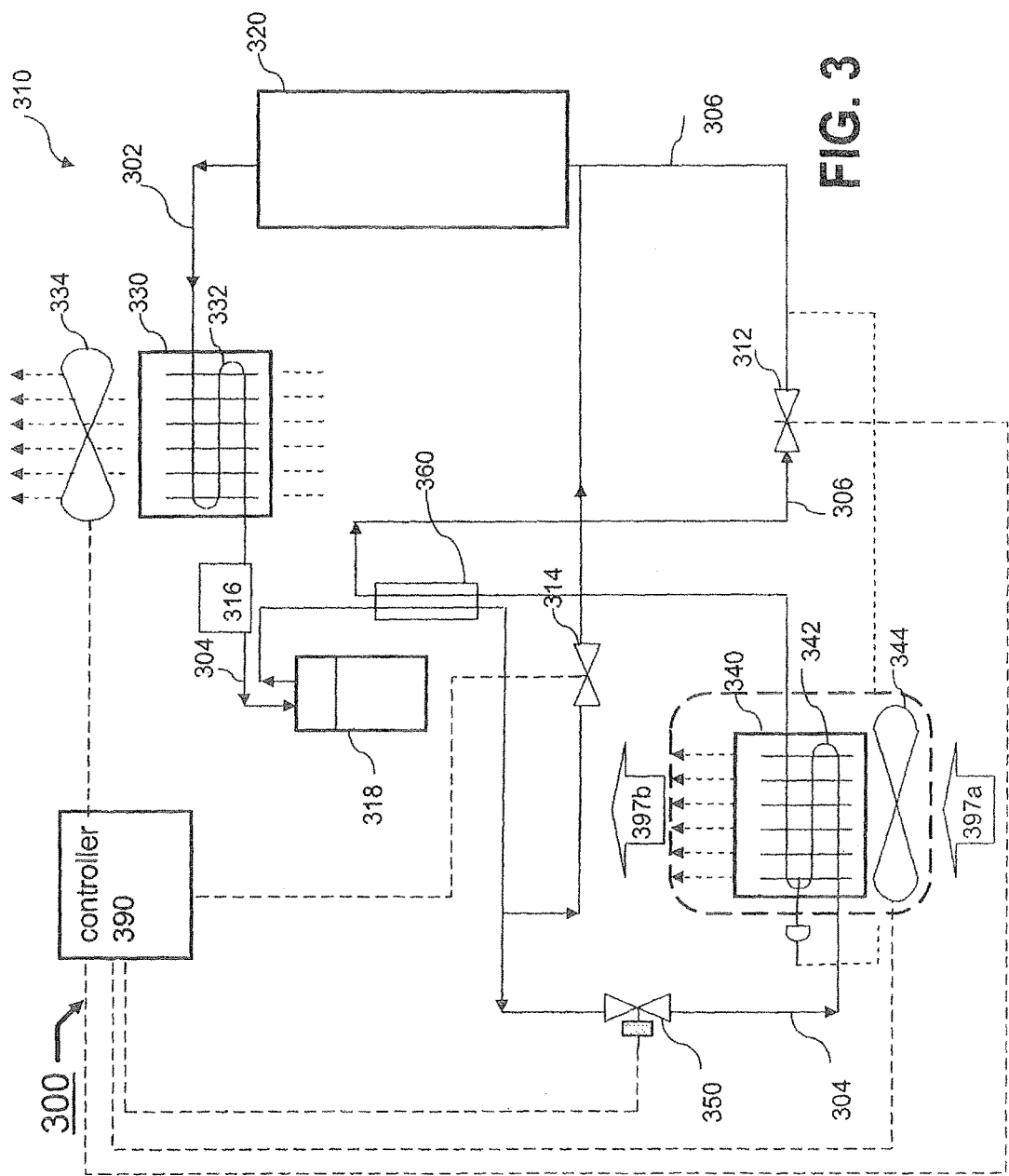
FIG. 3 schematically illustrates an exemplary embodiment of the transport refrigeration unit of FIG. 1.

FIG. 3 is a diagram that illustrates an exemplary embodiment of the transport refrigeration unit of FIG. 1. As shown in FIG. 3, an exemplary embodiment of a transport refrigeration system 300 can include a compressor 320, a heat rejection heat exchanger 330 including a coil 332 and associated fan(s) 334, a heat absorption heat exchanger 340 including a coil 342 and associated fan(s) 344, and an evaporator thermal expansion valve (TXV) 350 connected in a conventional manner by refrigerant lines 302, 304 and 306 in a refrigerant flow circuit. The compressor 320 can be a reciprocating compressor or a scroll compressor, single-stage or two-stage; however, the particular type of compressor used herein is not intended to or limiting.

Refrigerant line 302 connects the discharge outlet of the compressor 320 in refrigerant flow communication with the inlet to the heat rejection heat exchanger coil 332, refrigerant line 304 connects the outlet of the coil 332 in refrigerant flow communication with the inlet to the heat absorption heat exchanger coil 342, and refrigerant line 306 connects the outlet of the coil 342 in refrigerant flow communication with the suction inlet of the compressor 320, thereby completing the refrigerant flow circuit. As depicted in the exemplary embodiments illustrated in FIG. 3, a refrigerant-to-refrigerant in-line heat exchanger 360 may be included in the refrigerant flow circuit for passing the liquid refrigerant passing through refrigerant line 304 in heat exchange relationship with the vapor refrigerant passing through refrigerant line 306. In addition, a suction modulation valve 312, a quench expansion valve 314, a filter/drier 316, and a receiver 318 may be included in the refrigerant circuit in refrigerant line 306 as in conventional practice. The system 300 can also include a temperature sensor 397a for sensing the temperature of the air returning to the heat absorption heat exchanger from the container and a temperature sensor 397b for sensing a temperature of the air being supplied to the container. Sensors (not shown) may also be provided for monitoring additional conditions such as for example ambient outdoor air temperature and humidity.

The refrigeration unit also includes an electronic controller 390 to operate the transport refrigeration unit 310 to maintain a predetermined thermal environment within the enclosed volume, e.g., a box, wherein the product is stored. The electronic controller 390 can maintain the predetermined environment by selectively controlling the operation of the compressor 320, the fan(s) 334 associated with the heat rejection heat exchanger coil 332, the fan(s) 344 associated with the heat absorption heat exchanger coil 342, and the suction modulation valve 312. For example, when cooling of the environment within the box is required, the electronic controller 390 provides electrical power to activate the compressor 320, the fan 334 and the fan 344. Additionally, the electronic controller 390 adjusts the position of the suction modulation valve 312 to increase or decrease the flow of refrigerant supplied to the compressor 320 as appropriate to control and stabilize the temperature within the box at the set point temperature, which corresponds to the desired product storage temperature for the particular product stored within the box.

Capacity modulation can be considered the process of controlling the cooling capacity provided by a refrigeration system to a desired value. The cooling capacity can be controlled to match the cooling load of the transport refrigeration system. For example, in transport refrigeration applications, the cooling capacity can be controlled to achieve and/or maintain a set point temperature in the cooled space or in the cargo (e.g., container 6). Related art capacity modulation in a transport refrigeration system can use refrigerant flow rate to a compressor. For example, related art capacity modulation in the system 2 can use a suction modulation valve (SMV) 254 to control the suction pressure and hence the suction flow rate to the compressor 212. When the SMV 254 is partially closed, a pressure drop is created between outlet of the refrigerant heat absorption heat exchanger 242 and an inlet of the compressor (e.g., the suction port 244). The reduced suction pressure can result in a lower suction density, which in turn can reduce the mass flow rate delivered by the compressor 212. A lower mass flow rate results in a lower cooling capacity in the refrigeration system. An additional effect of the capacity modulation control method using the SMV 254 is that the pressure ratio across the compressor 212 can increase. The increased pressure ratio can cause the compressor discharge temperature to increase to exceed the acceptable limit and reduce the life time of the compressor. In some transport refrigeration applications, increased pressure ratio can necessitate (e.g., can be reduced by) introducing a hot gas by-pass (HGBP) valve, which can short-circuit the compressor discharge to the evaporator inlet and thereby reduce the pressure ratio across the compressor.

Embodiments of apparatus transport refrigeration units, and methods for the same can address or overcome various capacity control disadvantages caused by or inherent to the capacity modulation with SMV (e.g., mass flow rate modulation to the compressor). In one embodiment, a method of operating a transport refrigeration unit can control the discharge pressure of the compressor to control the cooling capacity of the transport refrigeration system. For example, when the cooling capacity is to be reduced, the controller 266 can reduce the compressor discharge pressure, which can reduce the cooling capacity without increasing the compressor pressure ratio or compressor discharge temperature. In one embodiment, the discharge pressure can be or must be actively controlled. For example, active control can be achieved by an electronic expansion valve (EXV) or by an actively controlled valve (e.g., a solenoid valve) in parallel to the main expansion valve, which may be a TXV, a capillary tube, or an orifice. One exemplary method embodiment also can require that the transport refrigeration system implement concurrent refrigerant charge management. For example, discharge pressure capacity control can combine charge management because the active refrigerant mass in the transport refrigeration system has to be reduced to prevent or reduce flooding; for example, at the evaporator outlet. In one embodiment, the concurrent charge management can be implemented by adding a refrigerant receiver to the transport refrigeration system such as but not limited to a liquid receiver, a suction accumulator, or a mid-pressure receiver.

In one embodiment, a flash tank and a vapor flow line (e.g., economizer solenoid valve) to the intermediate stage of the compressor (or inlet of the compressor) can address concurrent charge management by controlling/trapping additional liquid refrigerant in the flash tank and controlling/passing additional vapor refrigerant to the compressor. In another embodiment, a suction accumulator operably coupled to the heat absorption heat exchanger (e.g., evaporator) can address concurrent charge management by controlling/trapping additional liquid refrigerant in the suction accumulator and controlling/passing additional vapor refrigerant to the compressor. Optionally in combination, an unload valve can be operated in combination with the vapor flow line or suction accumulator to address compressor mid-stage or discharge pressure variation.

Embodiments of the application can be applicable to $CO_2$ transport refrigeration systems because $CO_2$ vapor compression refrigeration systems tend to have high compressor discharge temperatures. Further, the additional increase in the compressor pressure ratio caused by an SMV can be problematic for components like the compressor in $CO_2$ systems. Further, $CO_2$ transport refrigeration systems have at least one EXV, which is suitable for discharge pressure control. $CO_2$ transport refrigeration system implementing 2-stage transport refrigeration units already have or require 2 expansion devices, which is suitable of discharge pressure control. Therefore, system/method embodiments according to the application can actively control modulating the cooling capacity of a $CO_2$ transport refrigeration system (e.g., without any additional component cost).

In one embodiment, methods of discharge pressure cooling capacity modulation can be combined with the related method of capacity modulation with SMV. For example, the combined capacity modulation (e.g., SMV cooling capacity modulation and compressor discharge pressure cooling capacity modulation) can be controlled by controller 266 to provide a better capacity control, and/or reduced component costs (e.g., less robust, smaller, or cheaper valves) for the SMV or the HGBP valve.

Figure 4:
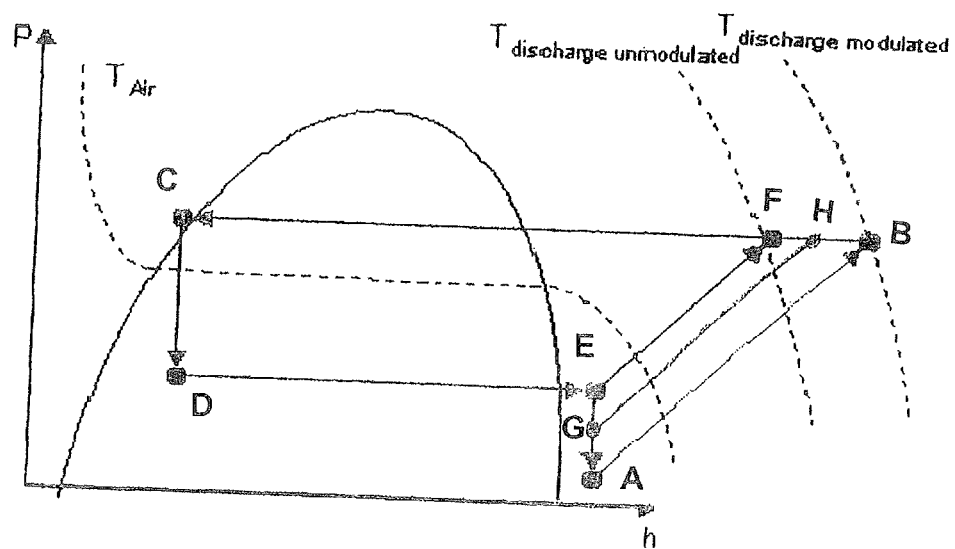
FIG. 4 graphically illustrates a pressure enthalpy diagram showing an exemplary thermodynamic refrigerant cycle of a refrigerant vapor compression system.
Figure 5:
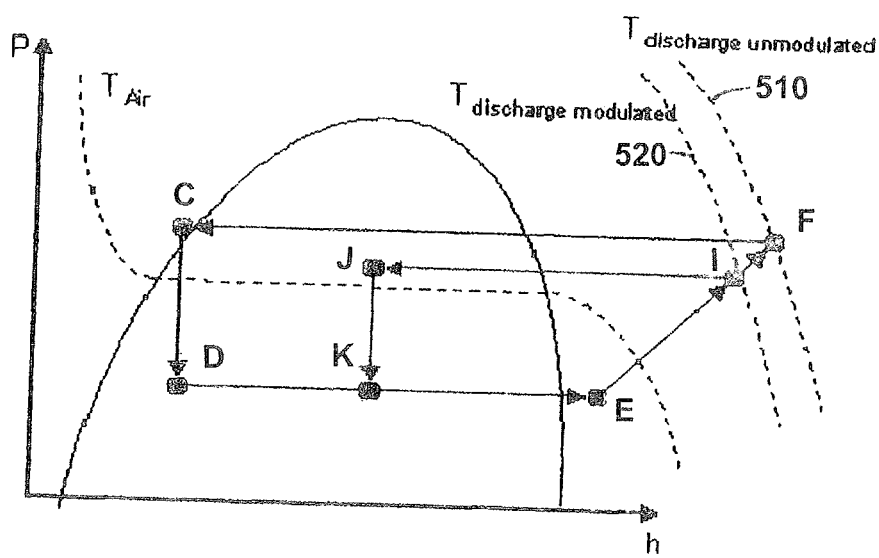
FIG. 5 graphically illustrates a pressure enthalpy diagram showing an exemplary thermodynamic refrigerant cycle of a refrigerant vapor compression system according to an embodiment of the application.

FIG. 4 is a diagram that shows a vapor compression cycle with cooling capacity modulation through SMV operations. FIG. 5 is a diagram that shows a vapor compression cycle with cooling capacity modulation through discharge pressure control.

Referring to FIGS. 4 and 5, an exemplary refrigeration cycle can be described using an embodiment of the refrigerant vapor compression system 2 with reference to an exemplary Pressure-Enthalpy diagram. At a point A, the refrigerant enters the compressor 212 at the suction port 244 and is pumped to a higher temperature and pressure, exiting the compressor 212 (e.g., the second stage of the compressor). Refrigerant vapor from the vapor injection line 258 can be mixed with the refrigerant exiting a first stage of the compressor 212 (not shown) but still exits the compressor 212 at the discharge port 216, shown at a point B. From point B to a point C, the refrigerant passes through the refrigerant heat rejection heat exchanger 220 and gives up heat at a constant pressure.

The refrigerant liquid at point C passing to point D is adiabatically expanded across the expansion valve 252. From point D to a point E, the refrigerant passes through the refrigerant heat absorption heat exchanger 242 and absorbs heat at constant pressure. From point E to point A, the refrigerant passes through an adiabatic expansion device, such as the suction modulation valve 254, to drop in pressure at essentially constant enthalpy before entering the compressor. The thermodynamic cycle described in FIG. 4 can be repeated. In simplified FIG. 4, a first stage of the compressor, the auxiliary expansion device 236, or the flash tank 230 are not shown.

As shown in FIG. 4, a thermodynamic cycle EFCDE is exemplary of operations when the SMV valve is absent or in a closed portion. As shown in FIG. 4, a thermodynamic cycle EGHCDE is exemplary of operations when the SMV valve is partially open and a thermodynamic cycle EABCDE is exemplary of operations when the SMV valve is fully open.

In contrast to FIG. 4, according to embodiments of the application, cooling capacity modulation through discharge pressure control can result in a reduced temperature difference between refrigerant and heat sink (e.g., air), which causes the specific cooling capacity to decrease. With constant mass flow through the system (e.g., an optional simplifying assumption), reduced compressor discharge pressure can result in a reduction of the system cooling capacity. Constant mass flow through the system during compressor discharge pressure control can be achieved using control by the controller 266 or system component configurations.

As shown in FIG. 5, a thermodynamic cycle EIJKE is exemplary of operations when cooling capacity is controlled by controlling or reducing the discharge pressure of the compressor. According to embodiments of the application, cooling capacity control using the compressor discharge pressure can be controlled using an actively controlled valve and concurrent refrigerant charge management. According to embodiments of the application, cooling capacity control using the compressor discharge pressure can be controlled between point F (Pdischarge un-modulated, Tdischarge un-modulated) 510 and point I (Pdischarge modulated, Tdischarge modulated) 520 using an actively controlled valve (e.g., electronic expansion valve (EXV) 236 or by an actively controlled valve (e.g., a solenoid valve) in parallel to the primary expansion valve 252) and/or concurrent refrigerant charge management. As shown at point J in FIG. 5, the heat rejection heat exchanger (e.g., gas cooler or condenser) does not have enough cooling capacity (e.g., surface area, temperature difference) to output liquid only (e.g., point C), and therefore can output a mixture of gas and liquid according to embodiments of the application.

In transport refrigeration systems, the compressor discharge temperature is usually limited to a certain value, which depends on the materials of construction of the compressor, the refrigerant, and the oil used for lubrication of the compressor. The compressor discharge temperature can depend on the operating conditions of the transport refrigeration system, the pressure lift in the compressor (or ratio of discharge to suction pressure), the compressor efficiency, and the compressor internal and external cooling. The pressure lift can have a more significant impact on the compressor discharge temperature than the compressor efficiency or compressor cooling.

One related art method to reduce the compressor discharge temperature is to inject liquid refrigerant into the compressor when the discharge temperature exceeds an allowable limit The liquid refrigerant can be injected into the compressor (e.g., intermediate inlet port 260) using a liquid injection line (e.g., liquid injection line 294). The liquid injection can be intermittent or constant. Liquid injection is a form of internal cooling that uses a portion of the cooling capacity generated by the transport refrigeration system to cool the compressor. Liquid injection cooling of the compressor therefore reduces the cooling capacity while the power consumption of the transport refrigeration system is generally unaffected. Thus, liquid injection cooling can reduce the energy efficiency of the transport refrigeration system. Liquid injection can also require an additional refrigerant line and flow control device (e.g., line 294, flow control device 296) to carry and control the amount of liquid flow into the compressor.

In one embodiment, a method of reducing the compressor discharge temperature according to the application can eliminate a dedicated refrigerant line and flow control device to simplify a construction of and/or reduce costs for a transport refrigeration unit.

Instead of injecting liquid refrigerant into the compressor, embodiments of the application can decrease the compressor discharge pressure of the transport refrigeration system until the compressor discharge temperature is below a prescribed threshold or a maximum limit The effect on system energy efficiency to the transport refrigeration system is similar to the effect of liquid injection. Exemplary method embodiments according to the application can require that the compressor discharge pressure can be modified depending on the desired or selected compressor discharge temperature (e.g., at current conditions). For example, compressor discharge pressure can be achieved or most effectively achieved if the transport refrigeration system is equipped with an adjustable flow control device as the expansion device, such as an electronic expansion valve.

Exemplary embodiments according to the application may be especially suited for $CO_2$ systems, since these systems are likely to be equipped with an adjustable flow control expansion device to control the heat rejection pressure, which is an independent system variable when the system operates as a transcritical system.

In one embodiment according to the application, the discharge pressure can control the discharge temperature of the compressor without affecting the transport refrigeration unit superheat. Two-stage refrigeration system can include an auxiliary expansion device 236 and/or have a high pressure side and a low pressure side of the transport refrigeration unit. Accordingly, the adjustment of the discharge pressure (e.g., using auxiliary expansion device 236) does not necessarily result in a change of the superheat control of the transport refrigeration system (e.g., evaporator superheat).

Various advantages that embodiments of apparatus, transport refrigeration units, and methods for operating the same can provide include controlling cooling capacity for a refrigerant vapor compression system. Embodiments can use discharge pressure control for modulating cooling capacity for a refrigerant vapor compression system. In one embodiment, compressor discharge pressure control can reduce the cooling capacity without increasing the compressor pressure ratio or discharge temperature. In one embodiment, discharge pressure control can reduce the cooling capacity independently of system component superheat. In one embodiment, discharge pressure control can control a compressor discharge temperature, for example, to remain below a threshold temperature. In one embodiment, compressor discharge pressure control can include control of an auxiliary expansion device disposed in a refrigerant flow path and active refrigerant charge levels in a refrigerant circuit.

Exemplary system and method embodiments according to the application can be implemented using various configurations for a primary refrigerant loop or a plurality of coupled refrigerant loops, for example, in the transport refrigeration unit. In one embodiment, a bypass line and unloader service valve can be optional. In one embodiment, a liquid injection line and corresponding flow control device can be optional. In one embodiment, a vapor injection line and corresponding flow control device can be optional. In one embodiment, the economizer valve can be implemented using other flow control devices such as but not limited to an economizer expansion valve. In one embodiment, the vapor injection line can be configured to selectively input into the compressor mid stage and/or the compressor inlet port.

Refrigerant vapor compression systems are commonly used for conditioning air to be supplied to a climate controlled comfort zone within a residence, office building, hospital, school, restaurant or other facility. Refrigerant vapor compression system are also commonly used for refrigerating air supplied to display cases, merchandisers, freezer cabinets, cold rooms or other perishable/frozen product storage areas in commercial establishments. Refrigerant vapor compression systems are also commonly used in transport refrigeration systems for refrigerating air supplied to a temperature controlled cargo space of a truck, trailer, container or the like for transporting perishable/frozen items by truck, rail, ship or intermodal.

While the present invention has been described with reference to a number of specific embodiments, it will be understood that the true spirit and scope of the invention should be determined only with respect to claims that can be supported by the present specification. Further, while in numerous cases herein wherein systems and apparatuses and methods are described as having a certain number of elements it will be understood that such systems, apparatuses and methods can be practiced with fewer than the mentioned certain number of elements. Also, while a number of particular embodiments have been set forth, it will be understood that features and aspects that have been described with reference to each particular embodiment can be used with each remaining particularly set forth embodiment. For example, aspects and/or features of embodiments variously described herein can be specifically interchanged or combined.

We claim:

1. A transport refrigerant vapor compression system, comprising:
   a refrigerant circuit including
   a refrigerant compression device having at least one compression stage,
   a refrigerant heat rejection heat exchanger operatively coupled downstream of a discharge port of the refrigerant compression device,
   a refrigerant heat absorption heat exchanger downstream of said refrigerant heat rejection heat exchanger operatively coupled upstream of an inlet port of the refrigerant compression device,
   a primary expansion device disposed in the refrigerant circuit downstream of said refrigerant heat rejection heat exchanger and upstream of said refrigerant heat absorption heat exchanger;
   a refrigerant reservoir disposed in the refrigerant circuit downstream of the refrigerant heat rejection heat exchanger and upstream of the primary expansion device;
   an auxiliary expansion device disposed in the refrigerant circuit, the auxiliary expansion device disposed in the refrigerant circuit downstream of the refrigerant heat rejection heat exchanger and upstream of the refrigerant reservoir; and
   a controller configured to control operation of the transport refrigerant vapor compression system, the controller configured to control the discharge pressure of the refrigerant compression device using both the refrigerant reservoir and the auxiliary expansion device during a transcritical vapor compression cycle or a subcritical vapor compression cycle without increasing a refrigerant compression device pressure ratio and while maintaining a refrigerant compression device discharge temperature below a threshold temperature.

2. The transport refrigerant vapor compression system of claim 1, where the auxiliary expansion device is disposed in a second refrigerant flow path, the second refrigerant flow path disposed in said refrigerant circuit downstream of the refrigerant heat rejection heat exchanger and upstream of the refrigerant heat absorption heat exchanger.

3. The transport refrigerant vapor compression system of claim 1, where the controller controls the discharge pressure of the refrigerant compression device using both the refrigerant reservoir and the auxiliary expansion device without changing a refrigerant heat absorption heat exchanger superheat or a refrigerant compression device superheat.

4. The transport refrigerant vapor compression system of claim 1, further comprising an adiabatic expansion device coupled to a suction inlet line, the controller configured to perform transport refrigerant vapor compression system capacity control using the adiabatic expansion device.

5. The transport refrigerant vapor compression system of claim 1, further comprising:
   at least one of a compressor discharge temperature (CDT) sensor and a compressor discharge pressure (CDP) transducer;
   the controller configured to determine the discharge pressure of the refrigerant compression device in response to the at least one of the compressor discharge temperature (CDT) sensor and the compressor discharge pressure (CDP) transducer;
   the controller configured to control the discharge pressure of the refrigerant compression device to reduce refrigerant compression device discharge temperature when the refrigerant compression device discharge temperature is above the threshold temperature.

6. The transport refrigerant vapor compression system of claim 5, where the primary expansion device is an adjustable flow control device (EEV), and the controller is configured to reduce the refrigerant compression device discharge temperature when the refrigerant compression device discharge temperature is above the threshold temperature by decreasing the discharge pressure of the refrigerant compression device using the adjustable flow control device (EEV).

7. The transport refrigerant vapor compression system of claim 1, comprising an economizer circuit associated with the refrigerant circuit.

8. The transport refrigerant vapor compression system of claim 7, wherein the economizer circuit includes a vapor refrigerant injection line opening to an intermediate pressure stage of the refrigerant compression device and a first flow control valve disposed in the vapor refrigerant injection line.

9. The transport refrigerant vapor compression system of claim 7, comprising a liquid refrigerant injection line upstream of the refrigerant heat absorption heat exchanger and opening to an inlet line of the refrigerant compression device and a second flow control valve disposed in the liquid refrigerant injection line.

10. The transport refrigerant vapor compression system of claim 7 comprising a refrigerant bypass line and third flow control valve to provide a refrigerant flow passage from an intermediate pressure stage of the refrigerant compression device back to an inlet line of the refrigerant compression device.

11. The transport refrigerant vapor compression system of claim 1, wherein a refrigerant is at least one of HCFC refrigerants, HFC refrigerants, natural refrigerants, or carbon dioxide, and wherein the transport refrigerant vapor compression system operates in one of a transcritical mode or a subcritical mode.

* * * * *